United States Patent
Aoyama et al.

(10) Patent No.: US 6,898,507 B2
(45) Date of Patent: May 24, 2005

(54) VEHICLE SPEED CONTROL SYSTEM

(75) Inventors: Takashi Aoyama, Kanagawa (JP);
Shigeki Fukushima, Tokyo (JP); Ryoji Kato, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 54 days.

(21) Appl. No.: 10/406,277

(22) Filed: Apr. 4, 2003

(65) Prior Publication Data

US 2003/0200021 A1 Oct. 23, 2003

(30) Foreign Application Priority Data

Apr. 4, 2002 (JP) ........................................ 2002-102938

(51) Int. Cl.[7] ........................ B60K 31/00; B60K 41/00; F02M 51/00
(52) U.S. Cl. ........................... 701/93; 701/110; 180/170
(58) Field of Search .................... 701/93, 110; 180/179, 180/170; 123/319, 349, 351, 361

(56) References Cited

U.S. PATENT DOCUMENTS

| | | | | |
|---|---|---|---|---|
| 5,003,482 A | * | 3/1991 | Teratani et al. | ............... 701/95 |
| 5,389,051 A | * | 2/1995 | Hirate et al. | ................ 477/111 |
| 6,052,644 A | * | 4/2000 | Murakami et al. | ............ 701/93 |
| 6,304,810 B1 | * | 10/2001 | Westerberg | .................. 701/93 |
| 6,347,680 B1 | * | 2/2002 | Mianzo et al. | .............. 180/197 |

* cited by examiner

*Primary Examiner*—Thomas G. Black
*Assistant Examiner*—Dalena Tran
(74) *Attorney, Agent, or Firm*—Birch, Stewart, Kolasch & Birch, LLP

(57) ABSTRACT

A vehicle speed control system includes a first electronic control unit for transmitting a difference between actual and target vehicle speeds and control constants that vary depending on the vehicle speed difference when it determines fulfillment of vehicle speed control conditions, and a second electronic control unit for performing the vehicle speed control based on the vehicle speed difference and control constants received through a communication line. Change of the control constants for adjustment of a vehicle speed control function of the system can be easily carried out by changing the control constants stored in the first electronic control unit.

11 Claims, 7 Drawing Sheets

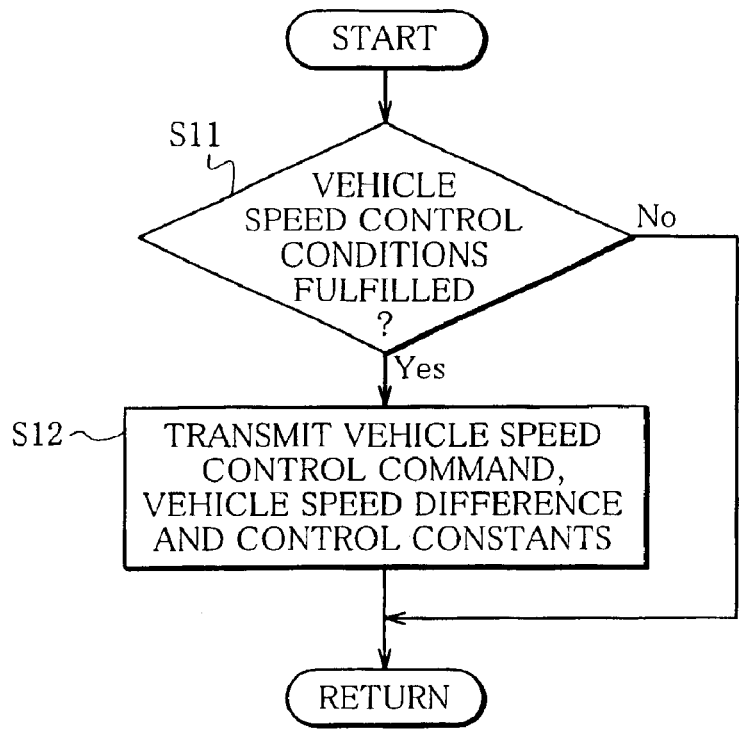
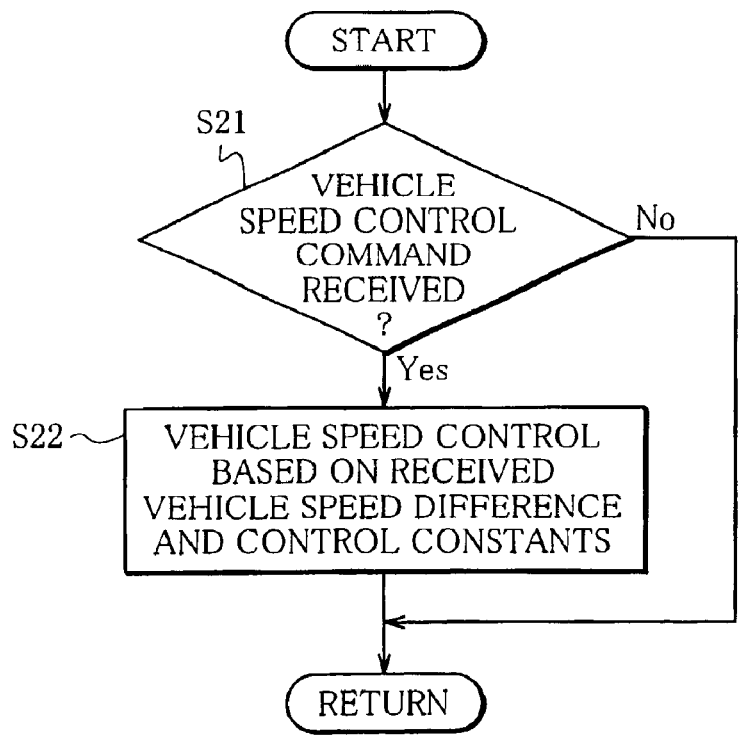

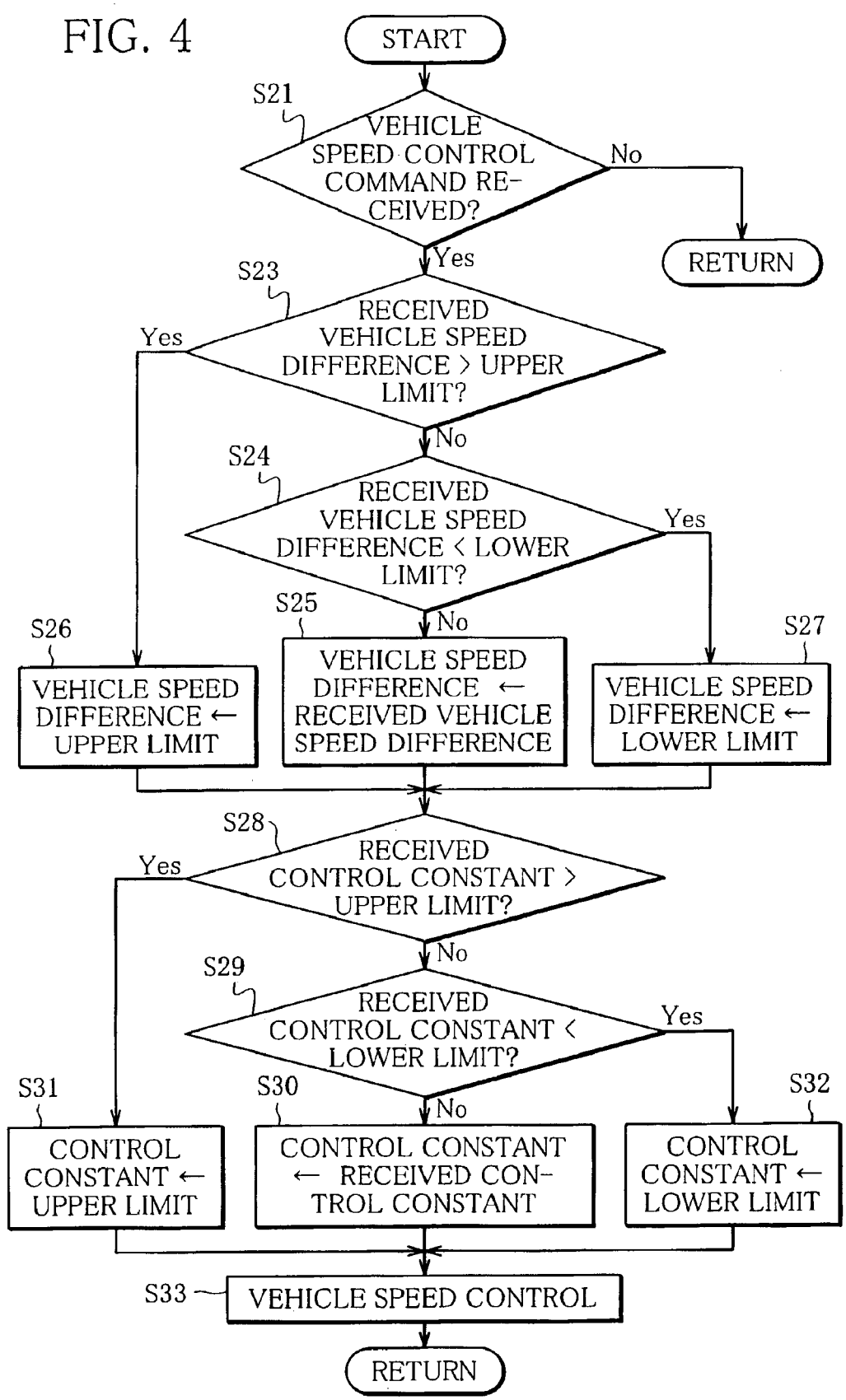

VEHICLE SPEED CONTROL SYSTEM

BACKGROUND OF THE INVENTION

1. Field of the Invention

The present invention relates to a vehicle speed control system, and more particularly, to a vehicle speed control system capable of easily changing control constants associated with a vehicle speed control function of the system.

2. Description of the Related Art

A vehicle speed control system provided with electronic control units for vehicle speed control and engine control that cooperate with each other to make speed control is known. This control system may be configured to perform auto-cruise control for achieving a constant-speed running of a vehicle. In such a vehicle speed control system, the electronic control unit for vehicle speed control hereinafter referred to as auto-cruise Ecu) is designed to determine whether or not conditions for vehicle speed control are fulfilled, and transmits pieces of control information, such as target vehicle speed and actual vehicle speed, to the electronic control unit for engine control (hereinafter referred to as engine ECU) when it determines fulfillment of the vehicle speed control conditions. The engine ECU operates to subject the pieces of control information received from the auto-cruise ECU to appropriate processing in term of Proportional-Integral-Derivative (PID) control or the like to thereby determine operated variables (e.g., amounts of operation of an actuator for fuel injection amount control and an auxiliary braking system). In accordance with the operated variables, the engine ECU controls the operations of the actuator and braking system to control engine output so that the actual vehicle speed coincides with the target vehicle speed.

During the development of a vehicle and/or engine, their/its specifications are frequently changed, and accordingly, control functions of vehicle control systems mounted thereon are frequently adjusted in order to meet the specifications of the vehicle and/or engine. In general, an electronic control unit of a vehicle control system is provided with control logics (constituted by hardware logics and/or software logics, for instance) that determine control procedure for achieving a control function, and control constants (including PID control gains, maps, tables, determination values, for instance) for execution of the control procedure. The control function, determined by the control logics and the control constants, can be adjusted by changing the control constants associated therewith.

However, in the above-mentioned vehicle speed control system, control constants associated with determination of vehicle speed control conditions are provided in the auto-cruise ECU, whereas control constants associated with determination of operated variables and engine control are provided in the engine ECU. For this reason, in order to adjust the vehicle speed control function of the system, it is necessary to individually change the control constants provided in the auto-cruise ECU and the control constants provided in the engine ECU, resulting in a complicated changing operation. Such a complicated operation for changing the control constants poses a problem that the efficiency of vehicle and/or engine development is lowered.

SUMMARY OF THE INVENTION

An object of the present invention is to provide a vehicle speed control system capable of easily changing control constants associated with a vehicle speed control function of the system.

According to one aspect of the present invention, there is provided a vehicle speed control system which includes first control means for transmitting a fulfillment signal when it determines that conditions for vehicle speed control are fulfilled, vehicle speed detecting means for detecting an actual vehicle speed, target vehicle speed setting means for setting a target vehicle speed, second control means for performing vehicle speed control to make the actual vehicle speed coincide with the target vehicle speed, and communication line means for connecting the first control means and the second control means to permit information transfer therebetween. In the vehicle speed control system, the first control means stores control constants for the vehicle speed control, and the second control means performs the vehicle speed control when it receives the fulfillment signal and required control constants from the first control means through the communication line means.

The vehicle speed control system of this invention, in which control constants associated with the vehicle speed control are stored in the first control means, makes it easy to change the control constants associated with the vehicle speed control function, as compared to a vehicle speed control system in which the control constants are dispersedly provided in the first and second control means. Thus, the vehicle speed control system of this invention makes it easy to change the control constants, i.e., to adjust the vehicle speed control function in accordance with the specifications of a vehicle and/or an engine, and hence contributes to improvement of the efficiency in vehicle and/or engine development.

Preferably, the first control means determines the required control constants based on a difference between the actual vehicle speed and the target vehicle speed, and transmits the determined control constants to the second control means. According to this aspect of the invention, the first control means is only required to transmit, among the control constants, those control constants which are required for the vehicle speed control at the present time point, and accordingly, the traffic on the communication line is suppressed.

Preferably, both the vehicle speed detecting means and the target vehicle speed setting means are connected to the first control means, and the first control means determines the difference between the actual vehicle speed and the target vehicle speed. According to the aspect of this invention, the traffic on the communication line decreases than the case where both an actual vehicle speed signal and a target vehicle speed signal are transmitted from the first control means to the second control means, thus improving the response in the vehicle speed control.

Preferably, when determining that the desired control constants or the difference falls outside a predetermined range, the first or second control means changes the control constants or the difference to an upper or lower limit value of the predetermined range, and the second control means performs the vehicle speed control based on the changed control constants or the changed difference. According to the aspect of this invention, an appropriate vehicle speed control is carried out.

Preferably, the second control means comprises response means for transmitting a response signal, representative of the received control constants, to the first control means, and the first control means comprises retransmission means for retransmitting the control constants when the control constants represented by the response signal do not coincide with the control constants immediately previously transmitted from the first control means to the second control means. According to the aspect of this invention, when accurate transmission of the control constants to the second control means cannot be achieved due to affection of noise or the like, the control constants can be retransmitted, thereby improving the accuracy of the vehicle speed control.

preferably, the second control means performs the vehicle speed control by controlling at least one of an engine throttle opening, a fuel injection amount, and an auxiliary braking force. According to the aspect of this invention, engine output control can be performed precisely, thus improving the accuracy of the vehicle speed control.

According to another aspect of the present invention, there is provided a vehicle speed control system which includes vehicle speed detecting means for detecting an actual vehicle speed, vehicle speed limit setting means for setting a vehicle speed limit, first control means for transmitting a fulfillment signal when it determines based on the actual vehicle speed and the vehicle speed limit that conditions for vehicle speed restriction are fulfilled, second control means for performing vehicle speed control to restrict the actual vehicle speed up to the vehicle speed limit, and communication line means for connecting the first control means and the second control means to permit information transfer therebetween. In the vehicle speed control system, the first control means stores control constants for the vehicle speed control, and the second control means performs the vehicle speed control when it receives the fulfillment signal and required control constants from the first control means through the communication line means. With this vehicle speed control system, the control constants associated with the vehicle speed control function can be easily changed.

Preferably, the first control means determines the required control constants based on a difference between the actual vehicle speed and the vehicle speed limit, and transmits the determined control constants to the second control means. Preferably, both the vehicle speed detecting means and the vehicle speed limit setting means are connected to the first control means, and the first control means determines the difference between the actual vehicle speed and the vehicle speed limit. According to the aspects of this invention, the traffic on the communication line decreases.

BRIEF DESCRIPTION OF THE DRAWINGS

FIG. 2 is a flowchart showing a control routine executed by an auto-cruise ECU shown in FIG. 1;

FIG. 3 is a flowchart showing a control routine executed by an engine ECU shown in FIG. 1;

FIG. 4 is a flowchart showing a control routine executed by an engine ECU of a vehicle speed control system according to a modification of the first embodiment;

DETAILED DESCRIPTION OF THE PRESENT INVENTION

Figure 1:
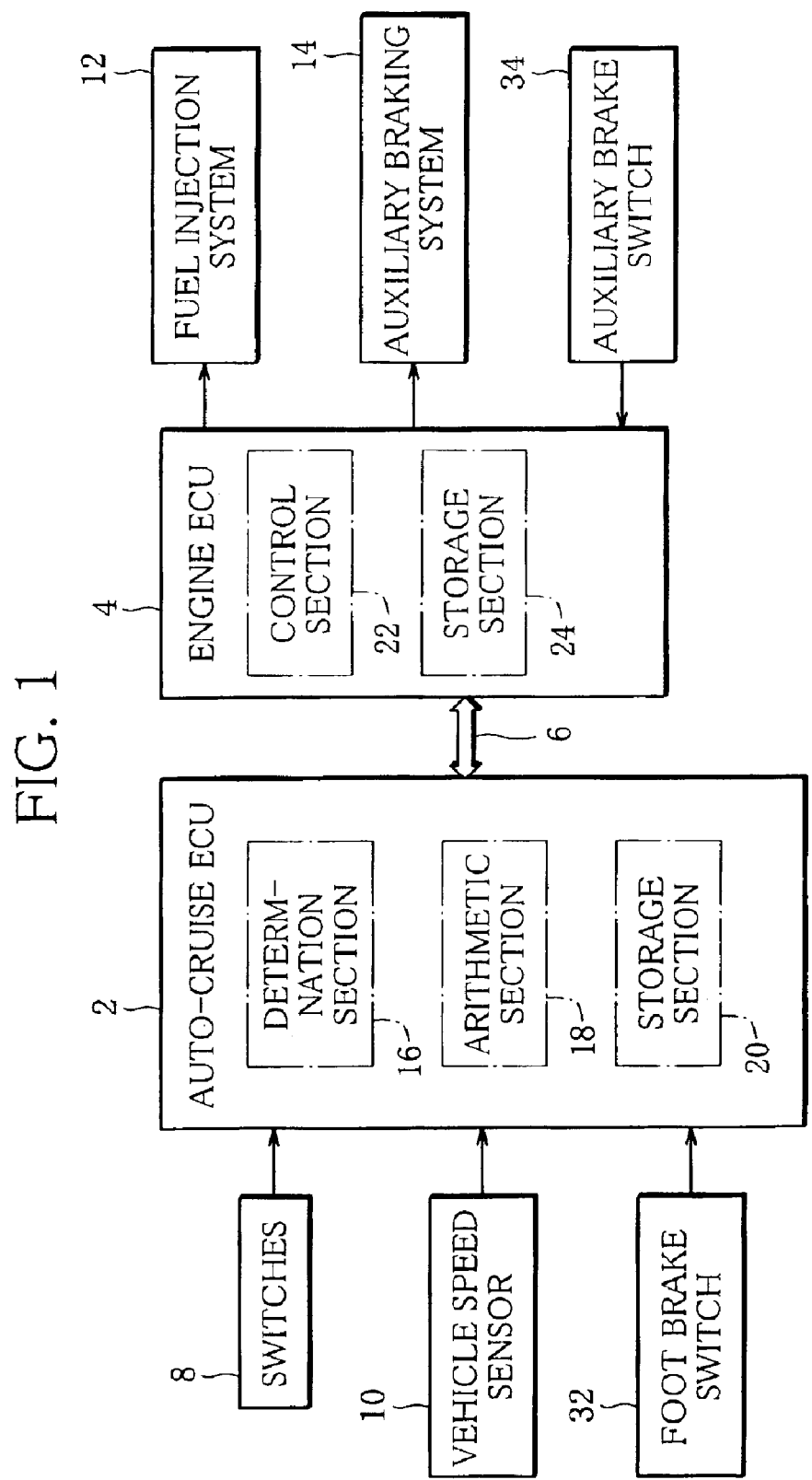
FIG. 1 is a schematic block diagram showing a vehicle speed control system according to a first embodiment of the present invention.

With reference to FIGS. 1–3, a vehicle speed control system according to a first embodiment of this invention will be explained.

The vehicle speed control system of this embodiment is designed to meet the specifications of a vehicle and an engine (both of which are not shown) to which the system is applied, and comprises electronic control units 2, 4 for auto-cruise control and for engine control (hereinafter referred to as auto-cruise ECU and engine ECU, respectively). These ECUs 2, 4 are each constituted by a hardware having electronic circuits mounted thereon, and are connected to each other through a vehicle communication line 6 (hereinafter referred to CAN (Controller Area Network)).

The auto-cruise ECU 2 is connected with switches 8 esociated with the auto-cruise control (more generally, vehicle speed control) and including a main switch for selectively rendering the auto-cruise control enabled or disabled, and a target vehicle speed setting switch (target vehicle speed setting means) for setting a desired target vehicle speed (e.g., in term of average speed per hour), for instance. The main and setting switches are designed to be operable a driver sitting on the driver's seat. Furthermore, the auto-cruise ECU 2 is connected with a vehicle speed sensor (vehicle speed detecting means) 10 and a foot brake switch 32 that is responsive to the operated position of a foot brake. The auto-cruise ECU 2 is adapted to detect an actual vehicle speed based on a detection signal from the vehicle speed sensor 10, reads the target vehicle speed set by the target vehicle speed setting switch, and calculates the difference (hereinafter referred to as vehicle speed difference) between the actual vehicle speed and the target vehicle speed at intervals of a predetermined cycle. The engine ECU 4 is connected to an auxiliary brake switch 34 responsive to operation of an auxiliary braking system 14, mentioned later. The engine ECU 4 detects information of operation of the auxiliary braking system 14 through the auxiliary brake switch 34, and transmits the information of operation to the auto-cruise ECU 2 through the CAN 6. Meanwhile, the auxiliary brake switch 34 may be connected to the auto-cruise ECU 2, and the information of operation of the auxiliary braking system 14 may be detected by the auto-cruise ECU 2.

More specifically, the auto-cruise ECU 2 comprises a determination section 16 for determining whether conditions (hereinafter referred to as vehicle speed control conditions) for execution of the auto-cruise control are fulfilled or not based on the vehicle speed, the status of operation of the switches 8, the status of braking operation by the foot brake or the auxiliary braking system, and the like, an arithmetic section 18 for performing arithmetic processing for the auto-cruise control, and a storage section 20 for accessibly and renewably storing therein all the control constants required for the auto-cruise control. In this embodiment, the storage section 20 stores sets of PID control constants respectively corresponding to various vehicle speed differences, e.g., in the form of a map, and the arithmetic section 18 is designed to calculate the vehicle speed difference from the actual vehicle speed and the target vehicle speed and determine, from the map, a set of the PID control constants corresponding to the calculated vehicle speed difference. The auto-cruise ECU 2 is adapted to transmit a fulfillment signal (vehicle speed control command) to the engine ECU 4 through the CAN 6 when it determines that the vehicle speed control conditions are fulfilled, and transmits the vehicle speed difference and the PID control constants at intervals of a predetermined cycle while the vehicle speed control conditions are kept fulfilled, thus serving as first control means.

On the other hand, the engine ECU is designed to control operations of the engine, a fuel injection system 12 of, e.g., electronically-controlled type, and an auxiliary braking system 14 mounted on the vehicle. The auxiliary braking system 14 is constituted by an engine brake assist system adapted to discharge compressed air in the compression stroke of the engine to convert compression work into engine braking force, an exhaust brake, or the like.

As for the auto-cruise control, the engine ECU 4 is designed to calculate fuel injection information and auxiliary braking information at intervals of a predetermined cycle based on the vehicle speed difference and the control constants that are received from the auto-cruise ECU 2 at intervals of a predetermined cycle, and transmit the fuel injection information and the auxiliary braking information individually to the fuel injection system 12 and the auxiliary braking system 14. The fuel injection system 12 controls the amount of actual fuel injection based on the fuel injection information, whereas the auxiliary braking system 14 controls the auxiliary braking force (exhaust braking force or engine braking force) based on the auxiliary braking information. By means of the fuel injection amount control and auxiliary braking force control, the actual vehicle speed is controlled so that the vehicle speed difference reduces to zero.

The engine ECU 4 comprises a control section 22 for controlling the operations of the fuel injection system 12 and auxiliary braking system 14, and a storage section 24 for accessibly and renewably storing pieces of information. The engine ECU 4 is designed to perform the auto-cruise control, i.e., vehicle speed control, when it receives the vehicle speed control command, vehicle speed difference, and control constants from the auto-cruise ECU 2, thus constituting second control means.

In the following, an explanation of the vehicle speed control by the vehicle speed control system shown in FIG. 1 will be given.

For the vehicle speed control, the auto-cruise and engine ECUs 2, 4 perform control routines individually shown in FIGS. 2 and 3 at intervals of a predetermined cycle, respectively.

In the control routine shown in FIG. 2, the auto-cruise ECU 2 determines whether or not the vehicle speed control conditions are fulfilled based on the status of operations of the switches 8, the status of operations of the foot brake and auxiliary braking system 14, the vehicle speed, and the like (step S11). If the result of determination is negative (No), i.e., if the vehicle speed control conditions are not fulfilled for the reason by way of example that either one of the foot brake and the auxiliary braking system 14 is in operation, the auto-cruise ECU 2 completes the control processing in the present control cycle.

Subsequently, when the main switch in the switches 8 is turned on by the driver to indicate his/her desire for a constant-speed running of the vehicle, the vehicle speed control conditions are fulfilled, if the vehicle conditions, braking operation conditions (both the foot brake and auxiliary braking system 14 are not in operation), and the like are satisfied. In this case, the result of determination at step S11 becomes affirmative (Yes).

When determining the fulfillment of the vehicle speed control conditions, the auto-cruise ECU 2 reads the target vehicle speed set by the driver's operation of the target vehicle speed setting switch, reads the actual vehicle speed from the vehicle speed sensor 10, and calculates the vehicle speed difference, at step S12. Next, the auto-cruise ECU 2 reads, from the storage section 20, control constants required for the auto-cruise control at the present time point, and transmits the vehicle speed difference and the control constants to the engine ECU 4 through the CAN 6 together with the vehicle speed control command.

In this embodiment, the control constants to be transmitted to the engine ECU 4 include proportional, integral and derivative gains for the so-called PID control, and the arithmetic section 18 operates to determine these PID control constants based on the vehicle speed difference.

On the other hand, the engine ECU 4 executes the control routine shown in FIG. 3 at intervals of a predetermined cycle. In this control routine, the engine ECU 4 determines whether or not it receives the vehicle speed control command from the auto-cruise ECU 2 (step S21). If the result of determination is negative, i.e., if it does not receive the vehicle speed control command, the control processing in this cycle is completed.

When the result of determination at step S21 becomes affirmative, i.e., when the receipt of the vehicle speed control command is determined, the engine ECU 4 performs the auto-cruise control based on the PID control constants and the vehicle speed difference that are received together with the vehicle speed control command (step S22). In the auto-cruise control, the operations of the fuel injection system 12 and auxiliary braking system 14 are controlled by the engine ECU 4 in such a manner that the vehicle speed difference reduces to zero, whereby the vehicles runs at a constant speed.

As mentioned above, according to the vehicle speed control system of this embodiment, all the control constants associated with the vehicle speed control are stored in the auto-cruise ECU 2, and accordingly, it is enough to change the control constants stored in the auto-cruise ECU 2 in adjusting the vehicle speed control function of the vehicle speed control system for adaptation to the specifications of the vehicle and/or engine, e.g., when these specifications are subject to modification. This makes it possible to greatly improve the efficiency of vehicle and/or engine development, especially, control systems thereof. Since the vehicle speed control system of this embodiment carries out signal transmission from the auto-cruise ECU 2 to the engine ECU 4 only when the vehicle speed control conditions are fulfilled, it is possible to avoid increased communication load and increased traffic on the communication line of the CAN 6. The vehicle speed difference varies with the progress of the vehicle speed control, and hence the control constants corresponding to the vehicle speed difference also vary. In this regard, only those signals (vehicle speed difference and control constants) which are required for the vehicle speed control at the present time point are transmitted to the engine ECU 4 together with the vehicle speed control command, and therefore, the communication load of and the traffic on the CAN 6 can be reduced, and the required capacity of the storage section 24 of the engine ECU 4 can be decreased. In addition, the auto-cruise ECU 2 reads the target and actual vehicle speeds from the switches 8 and the vehicle speed sensor 10 to calculate the vehicle speed difference and transmits the calculated difference to the engine ECU 4, and therefore, the communication load of and the traffic on the CAN 6 can be further reduced as compared with a case where both the actual and target vehicle speeds are transmitted to the engine ECU 4.

The aforementioned first embodiment may be modified variously.

For instance, all the control constants associated with the auto-cruise control are stored in the storage section 20 of the auto-cruise ECU 2 in the first embodiment, however, the present invention does not indispensably require that all such control constants be stored in the auto-cruise ECU 2. For example, those control constants which are not affected by alterations of a control logic associated therewith in the vehicle speed control system (i.e., which are not required to be changed even when the control logic is altered) may be stored in the storage section 24 of the engine ECU 4.

Although the first embodiment is designed to transmit the vehicle speed control command, vehicle speed difference, and control constants from the auto-cruise ECU 2 to the engine ECU 4 when the auto-cruise ECU 2 determines the fulfillment of the vehicle speed control conditions, all the control constants associated with the vehicle speed control may be transmitted at a time from the auto-cruise ECU 2 to the engine ECU 4 when the main switch (ignition key) of the vehicle is turned on by the driver.

In this modification, the vehicle speed sensor is connected to the engine ECU 4, and the actual vehicle speed is detected by the engine ECU 4. The target vehicle speed setting switch of the switches 8 is connected to the auto-cruise ECU 2 or the engine ECU 4, so that the target vehicle speed is transmitted from the auto-cruise ECU 2 to the engine ECU 4 or detected by means of the engine ECU 4. The engine ECU 4 determines the PID control constants based on the actual vehicle speed detected by itself and the target vehicle speed transmitted from the auto-cruise ECU 2 or detected by the engine ECU 4.

In the first embodiment, the operations of the fuel injection system 12 and auxiliary braking system 14 for the vehicle speed control are controlled by the engine ECU 4. Alternatively, a throttle actuator for adjusting the throttle opening may be controlled by the engine ECU 4, or one or both of the fuel injection system 12 and the auxiliary braking system 14 may be controlled together with the throttle actuator. By adjusting the throttle opening of the engine by means of the throttle actuator, it is possible to perform the vehicle speed control with accuracy and with satisfactory response.

In the first embodiment, when the control constants and/or vehicle speed difference falls outside their/its predetermined range, the control constants and/or vehicle speed difference may be changed by the auto-cruise ECU 2 or engine ECU 4 to their/its upper or lower limit value of the predetermined range, so that the engine ECU 4 may carry out the vehicle speed control based on the changed control constants and/or vehicle speed difference.

In this modification, the engine ECU 4 executes a control routine shown in FIG. 4, for instance.

The control routine of FIG. 4 corresponds to the control routine shown in FIG. 3, in which when determining receipt of the vehicle speed control command from the auto-cruise ECU 2 at step S21, the engine ECU 4 makes a determination as to whether or not the vehicle speed difference received together with the vehicle speed control command is larger than an upper limit value of a predetermined range for vehicle speed difference (step S23). If the vehicle speed difference is equal to or less than the upper limit value, the engine ECU 4 determines whether or not the vehicle speed difference is less than a lower limit value of the predetermined range (step S24). If the result of determination at step S24 is negative, i.e., if the received vehicle speed difference falls within the predetermined range, the received vehicle speed difference is set as the vehicle speed difference for the vehicle speed control (step S25). On the other hand, if the received vehicle speed difference exceeds the upper limit value, the upper limit value is set as the vehicle speed difference for the vehicle speed control (step S26), whereas the lower limit value is set as the vehicle speed difference for the vehicle speed control if the received vehicle speed difference is less than the lower limit value (step S27).

Next, the engine ECU 4 determines whether or not each of the control constants received together with the vehicle speed control command is larger than an upper limit value of a predetermined range for that control constant (step S28). If the control constant is equal to or less than the upper limit value, the engine ECU 4 makes a determination as to whether or not the control constant is less than a lower limit value of the predetermined range (step S29). When the received control constant falls within the predetermined range, it is set as the control constant for the vehicle speed control (step S30). On the other hand, if the received control constant exceeds its upper limit value, the upper limit value is set as the control constant for the vehicle speed control (step S31), whereas the lower limit value is set as the control constant for the vehicle speed control if the received control constant is less than the lower limit value (step S32).

Next, the engine ECU 4 carries out the vehicle speed control based on the vehicle speed difference set at step S25, S26 or S27 and the control constants set at step S30, S31 or S32 (step S33).

Figure 5:
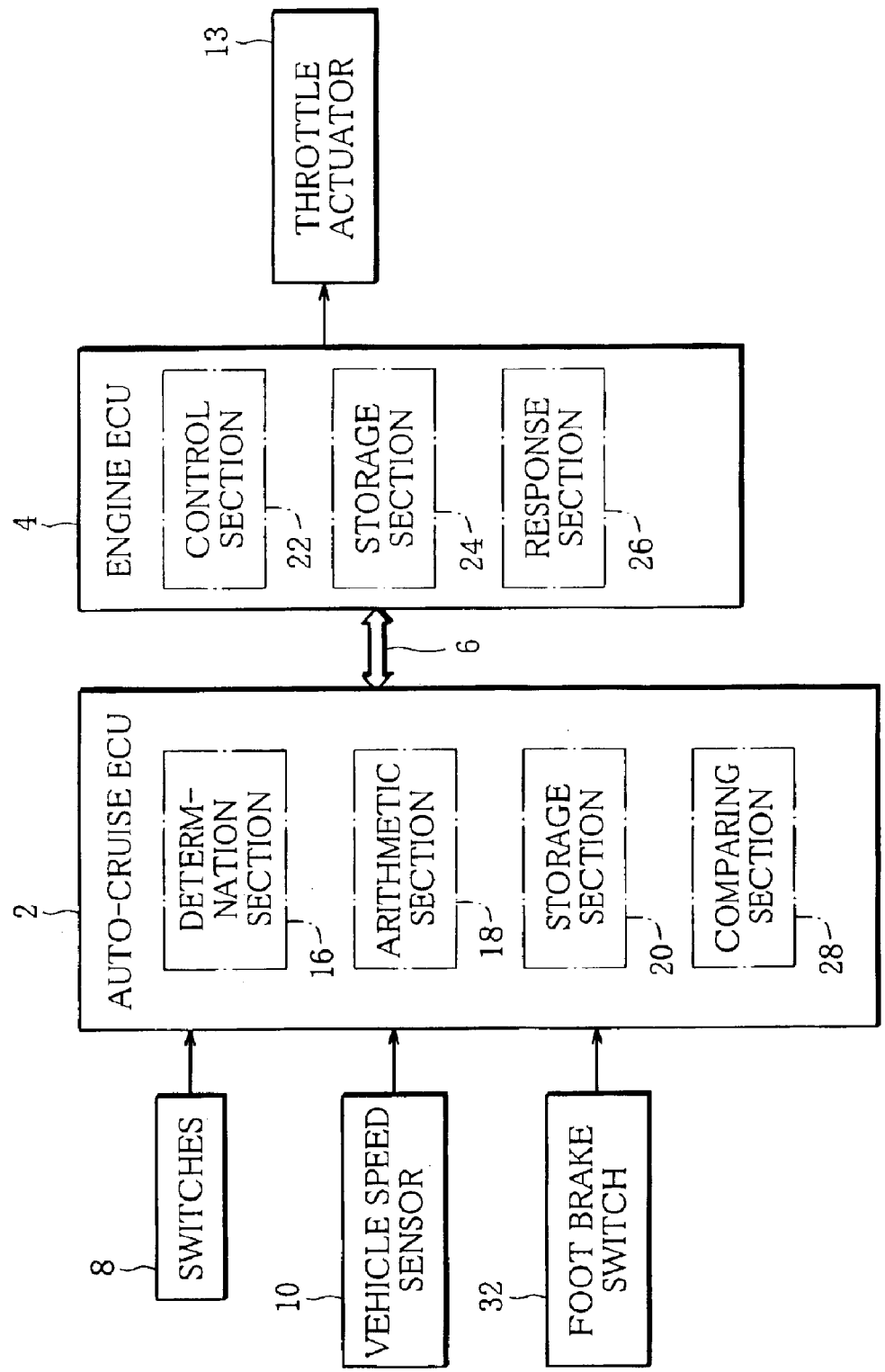
FIG. 5 is a schematic block diagram showing a vehicle speed control system according to a second embodiment of this invention.
Figure 6:
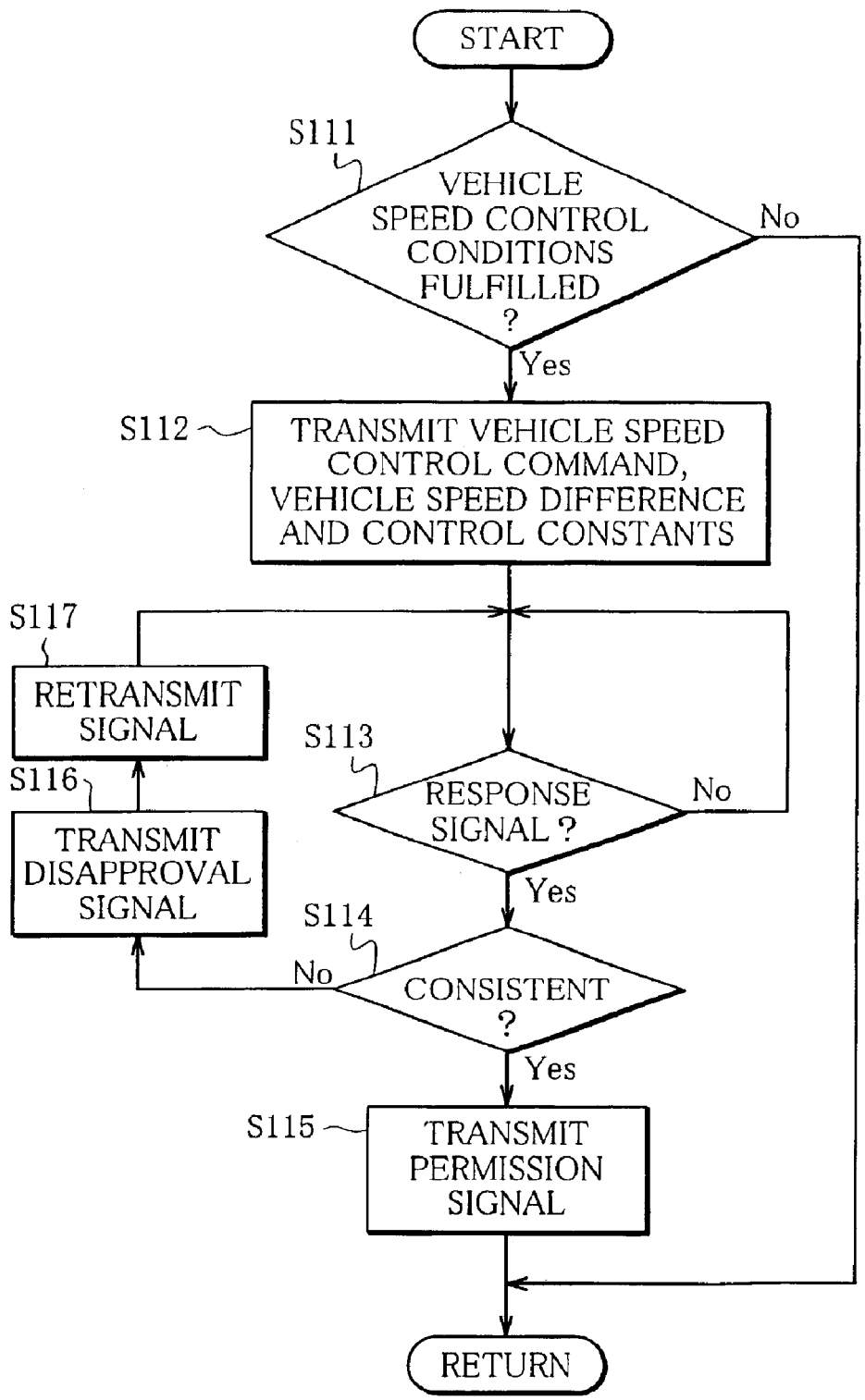
FIG. 6 is a flowchart showing a control routine executed by an auto-cruise ECU shown in FIG. 5.
Figure 7:
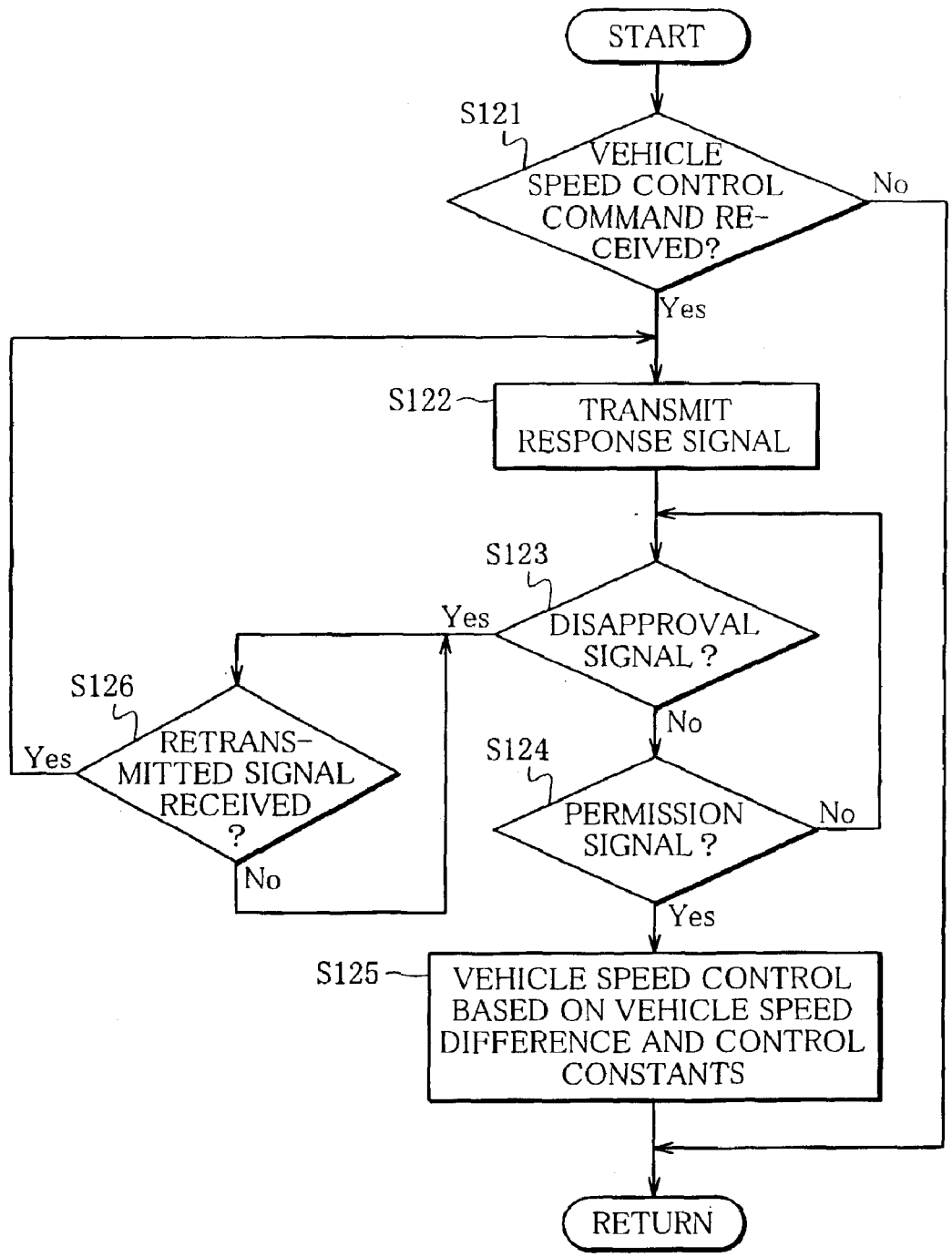
FIG. 7 is a flowchart showing a control routine executed by an engine ECU shown in FIG. 5.

With reference to FIGS. 5–7, a vehicle speed control system according to a second embodiment of this invention will be explained.

As compared to the system of the first embodiment, the vehicle speed control system of the second embodiment differs in that a signal is retransmitted to achieve accurate vehicle speed control when there occurs an error in the signal, having been transmitted immediately previously from the auto-cruise ECU 2 to the engine ECU 4, attributable to noise or the like, and that the vehicle speed control is carried out by adjusting the throttle opening by means of a throttle actuator. In other respects, the vehicle speed control system of this embodiment is the same as the first embodiment.

As shown in FIG. 5, the engine ECU 4 of this embodiment, constituting response means, comprises a response section 26 adapted to transmit a response signal to the auto-cruise ECU 2 through the CAN 6, which signal includes the vehicle speed difference and control constants (PID control constants) that are the same in content as those transmitted immediately previously from the auto-cruise ECU 2.

On the other hand, the auto-cruise ECU 2 comprises a comparing section 28 for receiving the response signal transmitted from the engine ECU 4. The comparing section 28 compares the vehicle speed difference and control constants represented by the response signal with the vehicle speed difference and control constants immediately previously transmitted from the auto-cruise ECU 2 to the engine ECU 4.

The vehicle speed difference and control constants transmitted from the auto-cruise ECU 2 to the engine ECU 4 may sometimes be influenced by noise during the transmission thereof. In this case, the engine ECU 4 may receive erroneous vehicle speed difference and control constants. Hence, inappropriate vehicle speed control may be performed based on such an erroneous signal received by the engine ECU 4.

In order to prevent such inappropriate vehicle speed control, the comparing section 28 of the auto-cruise ECU 2 transmits a permission signal to the engine ECU 4 when the contents of the response signal (vehicle speed difference and control constants) transmitted from the engine ECU 4 coincide with those of the signal having been immediately previously transmitted from the auto-cruise ECU 2, whereas it transmits a disapproval signal when the contents of the response signal do not coincide with those of the signal transmitted from the auto-cruise ECU 2, determining that an error was caused in the transmitted signal due to noise, for instance, and retransmits, to the engine ECU 4, a signal that is the same in content as the immediately previously transmitted signal. Thus, the comparing section 28 constitutes retransmission means.

When receiving the permission signal, the engine ECU 4 controls the operation of the throttle actuator 13 based on the immediately previously received vehicle speed difference and control constants, thus performing the vehicle speed control, whereas it awaits for the retransmission of signal from the auto-cruise ECU 2 when it receives the disapproval signal. Subsequently, when receiving the retransmitted signal from the auto-cruise ECU 2, the engine ECU 4 sends back a response signal which is the same in content as the received signal, and awaits for receipt of a permission or disapproval signal. Since the vehicle speed control is restrained from being executed until the receipt of permission signal, inappropriate vehicle speed control based on erroneous signal can be prevented.

More specifically, the auto-cruise and engine ECUs 2, 4 respectively execute control routines individually shown in FIGS. 6 and 7 for the vehicle speed control.

When determining that the vehicle speed control conditions are fulfilled at step S111 in the control routine shown in FIG. 6 (corresponding to step S11 in FIG. 2), the auto-cruise ECU 2 transmits the vehicle speed control command, vehicle speed difference, and control constants (step S112 corresponding to step S12 in FIG. 2), and awaits for the transmission of response signal from the engine ECU 4 (step S113). Next, the auto-cruise ECU 2 determines whether or not the content of the response signal coincides with the content of the signal which was immediately previously transmitted from the auto-cruise ECU 2 (step S114), and transmits the permission signal if the contents of these two signals coincide with each other (step S115).

When it is determined that the contents of these signals do not coincide with each other, on the other hand, the auto-cruise ECU 2 transmits the disapproval signal (step S116), and retransmits a signal that is the same in content as the immediately previously transmitted signal (step S117). The control flow proceeds to step S113, where the auto-cruise ECU 2 awaits for transmission of a response signal from the engine ECU 4.

On the other hand, the engine ECU 4 transmits a response signal representative of the vehicle speed difference and control constants that have just been received together with the vehicle speed control command (step S122) when it determines the receipt of the vehicle speed control command at step S121 of the control routine shown in FIG. 7 (corresponding to step S21 in FIG. 3). Then, the engine ECU 4 awaits for transmission of a disapproval or permission signal from the auto-cruise ECU 2 (steps S123, S124). When the receipt of permission signal is determined at step S124, the engine ECU 4 performs the vehicle speed control based on the immediately previously received vehicle speed difference and control constants (step S125 corresponding to step S22 in FIG. 3).

On the other hand, the receipt of disapproval signal is determined at step S123, the engine ECU 4 awaits for retransmission of signal from the auto-cruise ECU 2 (step S126). When receiving the retransmitted signal, the engine ECU 4 transmits a response signal which is the same in content as the just-received signal (step S122).

In the vehicle speed control system of the second embodiment, the vehicle speed control is prevented until the engine ECU 4 receives the permission signal from the auto-cruise ECU 2 as mentioned above, and therefore, it is possible to prevent inappropriate vehicle speed control based on an erroneous signal.

The second embodiment can be modified variously.

For instance, it is not indispensably required that all the control constants associated with the auto-cruise control (vehicle speed control) be stored in the auto-cruise ECU 2, but those control constants which are not affected by alterations of a control logic associated therewith may be stored in the engine ECU 4, as in the case of the modification of the first embodiment. In addition, it is possible to transmit all the control constants associated with the vehicle speed control at a time from the auto-cruise ECU 2 to the engine ECU 4 when it is determined that the main switch of the vehicle is turned on.

In the second embodiment, when receiving a retransmitted signal from the auto-cruise ECU 2, the engine ECU 4 transmits a response signal which is the same in content as the retransmitted signal. Alternatively, the engine ECU 4 may immediately carry out the vehicle speed control based on the retransmitted signal received from the auto-cruise ECU 2. That is, signal retransmission from the auto-cruise ECU 2 is performed only once in this modification, unlike the second embodiment where the signal retransmission is carried out repeatedly as required.

In the second embodiment, the auto-cruise ECU 2 retransmits a signal (vehicle speed difference and control constants) when determining that both the vehicle speed difference and control constants having been sent back from the engine ECU 4 do not coincide with ones immediately previously transmitted from the auto-cruise ECU 2. Alternatively, the retransmission may be made when it is determined that only either one of the vehicle speed difference and the control constants, e.g., only the control constants, sent back from the engine ECU 4 do not coincide with corresponding ones having been previously transmitted from the auto-cruise ECU 2. At that time, the auto-cruise ECU 2 may retransmit both the vehicle speed difference and control constants, or may retransmit only either one of them that is determined as being inconsistent.

It is possible for the engine ECU 4 to determine whether or not the control constants (preferably, both the vehicle speed difference and control constants) fall within a prescribed allowable range, change the control constants to their allowable upper or lower values, if the control constants fall outside the allowable range, and carry out the vehicle speed control based on the changed control constants.

For the vehicle speed control, either one or both of the fuel injection system 12 and the auxiliary braking system 14 may be controlled together with the throttle actuator 13 by means of the engine ECU 4, unlike the second embodiment where only the throttle actuator 13 is controlled.

In the following, a vehicle speed control system according to a third embodiment of this invention will be explained with reference to FIG. 8.

As compared to the system according to the first embodiment that performs the auto-cruise control for constant-speed running of the vehicle, the vehicle speed control system of the third embodiment differs in that it performs vehicle speed restriction control for maintaining the vehicle speed to be equal to or below a predetermined maximum speed limit. In other respects, the vehicle speed control system of this embodiment is the same as the first embodiment.

Figure 8:
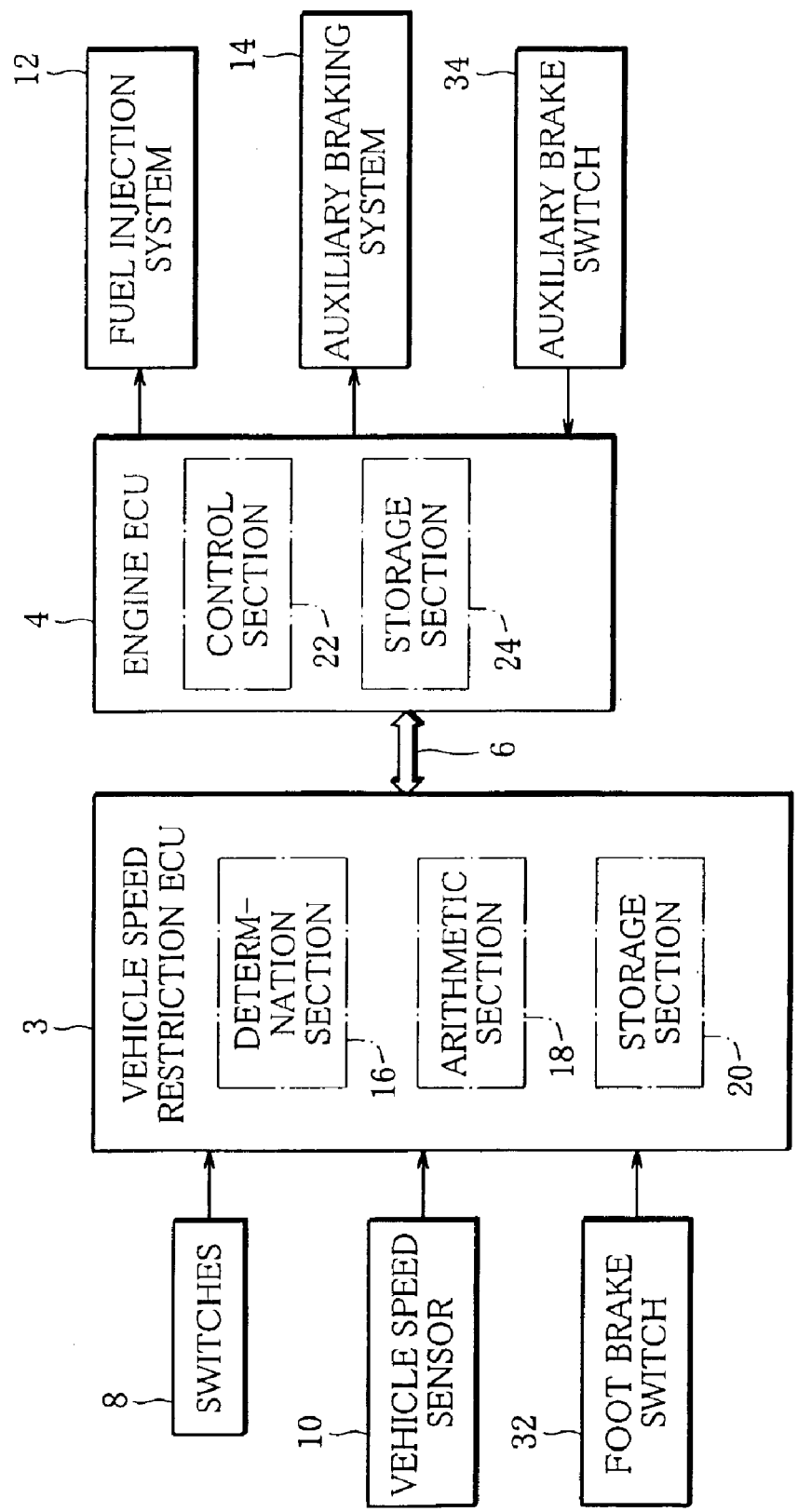
FIG. 8 is a schematic block diagram showing a vehicle speed control system according to a third embodiment of this invention.

As shown in FIG. 8 the vehicle speed control system of the third embodiment comprises an electronic control unit 3 (hereinafter referred to as vehicle speed restriction ECU) for vehicle speed restriction, to which an upper vehicle speed setting switch belonging to the switches 8 and the vehicle speed sensor 10 are connected. For the vehicle speed restriction control, the vehicle speed restriction ECU 3, constituting first control means, carries out a control routine (not shown) that is similar to the control routine shown in FIG. 2. That is, the vehicle speed restriction ECU 3 determines whether or not vehicle speed restriction conditions (more generally, vehicle speed control conditions) are fulfilled based on the actual vehicle speed detected by the vehicle speed sensor 10 and the upper vehicle speed limit (more generally, vehicle speed limit) set in advance by the driver's operation of the upper vehicle speed setting limit switch, and transmits a vehicle speed restriction command (fulfillment signal), vehicle speed difference, and control constants to the engine ECU 4 through the CAN 6 when determining the fulfillment of the vehicle speed restriction conditions. The vehicle speed difference is determined from the actual vehicle speed and upper vehicle speed limit, and the control constants are determined in accordance with the vehicle speed difference. In this manner, pieces of information required for the vehicle speed restriction at the present time point alone are transmitted from the vehicle speed restriction ECU 3 to the engine ECU 4 through the CAN 6, whereby the traffic on the CAN 6 can be relieved.

Furthermore, since all the control constants for the vehicle speed restriction control are stored in the storage section 20 of the vehicle speed restriction ECU 3, the vehicle speed restriction function of this system can be adjusted by changing these control constants, constituting all the control constants to be provided in the system, thus contributing to the improvement of the efficiency of vehicle and/or engine development.

When receiving the vehicle speed restriction command from the vehicle speed restriction ECU 3 through the CAN 6, the engine ECU 4 controls the operations of the fuel injection system 12 and auxiliary braking system 14 in accordance with the vehicle speed difference and control constants that have just been received together with the vehicle speed restriction command, thereby performing the vehicle speed restriction control for restricting the actual vehicle speed to be equal to or less than the upper vehicle speed limit. Thus, the engine ECU 4 constitutes second control means.

The vehicle speed control system of the third embodiment can be modified variously.

For instance, it is not indispensable for the vehicle speed restriction ECU 3 to store all the control constants associated with the vehicle speed restriction control, but those control constants which are hardly affected by alterations of a control logic associated therewith may be stored in the engine ECU 4, as in the case of the modification of the first embodiment. In addition, it is possible to transmit all the control constants associated with the vehicle speed restriction control at a time from the vehicle speed restriction ECU 3 to the engine ECU 4 when the main switch of the vehicle is turned on. The vehicle speed control system of this modification can be designed such that the engine ECU 4 determines the control constants based on the difference between the actual vehicle speed detected by itself and the upper vehicle speed limit received from the vehicle speed restriction ECU 3 or detected by the engine ECU 4, whereby the traffic on the communication line can be relieved.

As in the case of the second embodiment, the response section and comparing section may be provided in the engine and vehicle speed restriction ECUs 4 and 3, respectively. For the vehicle speed restriction control, the throttle actuator 13 shown in FIG. 5 may be controlled, instead of the fuel injection system 12 and the auxiliary braking system 14. Alternatively, either one or both of the fuel injection system 12 and auxiliary braking system 14 may be controlled together with the throttle actuator 13.

When the vehicle speed difference and/or control constants fall outside their/its predetermined range, the vehicle speed difference and/or control constants may be changed to their/its upper or lower limit value, so as to perform the vehicle speed restriction control based on the changed vehicle speed difference and/or control constants.

In the third embodiment, an upper limit vehicle speed limit is set in advance as vehicle speed limit and the vehicle speed is maintained to be equal to or lower than the upper vehicle speed limit. However, a lower vehicle speed limit may be set in advance as the vehicle speed limit and the vehicle speed may be maintained to be equal to or higher than the lower vehicle speed limit.

In other respects, the vehicle speed control system of this invention may be modified in various manners, e.g., by combining the features of the first, second and third embodiments. The control procedures of FIGS. 2–4, 6 and 7 are shown solely by way of example, and the control procedures applicable to the present invention are not limited thereto.

What is claimed is:

1. A vehicle speed control system, comprising:
   first control means for transmitting a fulfillment signal when determining that conditions for vehicle speed control are fulfilled, said first control means storing control constants for the vehicle speed control;
   vehicle speed detecting means for detecting an actual vehicle speed;
   target vehicle speed setting means for setting a target vehicle speed;
   second control means for controlling vehicle speed such that the actual vehicle speed coincides with the target vehicle speed; and
   communication line means for connecting the first control means and the second control means to permit information transfer therebetween,
   wherein said second control means controls the vehicle speed when the second control means receives the fulfillment signal and required control constants from said first control means through said communication line means.

2. The vehicle speed control system according to claim 1, wherein said first control means determines the required control constants based on a difference between the actual vehicle speed and the target vehicle speed, and transmits the determined control constants to said second control means.

3. The vehicle speed control system according to claim 1, wherein both said vehicle speed detecting means and said target vehicle speed setting means are connected to said first control means, and said first control means determines the difference between the actual vehicle speed and the target vehicle speed.

4. The vehicle speed control system according to claim 1, wherein, when determining that the desired control constants or the difference falls outside a predetermined range, said first or second control means changes the control constants or the difference to an upper or lower limit value of the predetermined range, and said second control means controls the vehicle speed based on the changed control constants or the changed difference.

5. The vehicle speed control system according to claim 1, wherein said second control means includes response means for transmitting a response signal, representative of the received control constants, to said first control means, and said first control means includes retransmission means for retransmitting the control constants when the control constants represented by the response signal do not coincide with the control constants immediately previously transmitted from said first control means to said second control means.

6. The vehicle speed control system according to claim 1, wherein said second control means performs the vehicle speed control by controlling at least one of an engine throttle opening, a fuel injection amount, and an auxiliary braking force.

7. A vehicle speed control system, comprising:

vehicle speed detecting means for detecting an actual vehicle speed;

vehicle speed limit setting means for setting a vehicle speed limit;

first control means for storing control constants for a vehicle speed control and for transmitting a fulfillment signal and required control constants when determining, based on the actual vehicle speed and the vehicle speed limit, that conditions for vehicle speed restriction are fulfilled;

second control means for controlling an engine to restrict the actual vehicle speed up to the vehicle speed limit; and communication line means for connecting the first control means and the second control means to permit information transfer therebetween, wherein said second control means controls the actual vehicle speed when the second control means receives the fulfillment signal and the required control constants from said first control means through said communication line means.

8. The vehicle speed control system according to claim 7, wherein said first control means determines the required control constants based on a difference between the actual vehicle speed and the vehicle speed limit, and transmits the determined control constants to said second control means.

9. The vehicle speed control system according to claim 7, wherein both said vehicle speed detecting means and said vehicle speed limit setting means are connected to said first control means, and said first control means determines the difference between the actual vehicle speed and the vehicle speed limit.

10. The vehicle speed control system according to claim 7, wherein said second control means controls the actual vehicle speed by controlling at least one of an engine throttle opening, a fuel injection amount, and an auxiliary braking force.

11. A vehicle speed control system, comprising:

vehicle speed detecting means for detecting an actual vehicle speed;

vehicle speed limit setting means for setting a vehicle speed limit;

first control means for transmitting a fulfillment signal when determining, based on the actual vehicle speed and the vehicle speed limit, that conditions for vehicle speed restriction are fulfilled, said first control means storing control constants for the vehicle speed control;

second control means for performing vehicle speed control to restrict the actual vehicle speed up to the vehicle speed limit; and communication line means for connecting the first control means and the second control means to permit information transfer therebetween, wherein said second control means controls the actual vehicle speed when the second control means receives the fulfillment signal and required control constants from said first control means through said communication line means, and wherein said second control means includes response means for transmitting a response signal, representative of the received control constants, to said first control means, and said first control means includes retransmission means retransmitting the control constants when the control constants represented by the response signal do not coincide with the control constants immediately previously transmitted from said first control means to said second control means.

* * * * *